(12) United States Patent
Silva

(10) Patent No.: US 12,480,475 B1
(45) Date of Patent: Nov. 25, 2025

(54) OFFSHORE FLOATING STRUCTURE FOR OFFSHORE POWER OPERATIONS

(71) Applicant: FMC Technologies, Inc., Houston, TX (US)

(72) Inventor: Gabriel Silva, Kingwood, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 18/953,982

(22) Filed: Nov. 20, 2024

(51) Int. Cl.
| | |
|---|---|
| *F03D 13/25* | (2016.01) |
| *F03B 13/14* | (2006.01) |
| *F03D 9/00* | (2016.01) |
| *F03D 9/11* | (2016.01) |
| *H02S 10/12* | (2014.01) |

(Continued)

(52) U.S. Cl.
CPC ............ *F03D 13/256* (2023.08); *F03B 13/14* (2013.01); *F03D 9/007* (2013.01); *F03D 9/11* (2016.05); *H02S 10/12* (2014.12); *H02S 10/20* (2014.12); *H02S 10/40* (2014.12); *H02S 40/10* (2014.12); *F05B 2240/93* (2013.01); *F05B 2240/95* (2013.01)

(58) Field of Classification Search
CPC .......... F03D 13/256; F03D 9/007; F03D 9/11; F03D 1/02; F03D 1/0675; F03D 7/0224; F03D 9/008; F03D 9/25; F03D 1/025; F03D 13/25; F03B 13/14; F03B 13/16; F03B 13/262; H02S 10/12; H02S 10/20; H02S 10/40; H02S 40/10; H02S 40/44; H02S 20/00; H02S 40/00; F05B 2240/93; F05B 2240/95; F05B 2220/706; F05B 2220/709; F05B 2260/70; F05B 2270/321; F05B 2220/708; B63B 35/44; B63B 2035/4453; B63B 2035/446; B63B 2035/4466; B63B 2001/044; B63B 1/048; F24S 60/00; F24S 10/40; F24S 90/00; F24S 2080/503; H02K 7/183; H02K 7/1853; H02N 2/185; H02N 2/18; Y02E 10/30; Y02E 10/60; Y02E 10/727; Y02E 10/40; Y02E 10/50; Y02E 10/72

See application file for complete search history.

(56) References Cited

U.S. PATENT DOCUMENTS

| | | | |
|---|---|---|---|
| 10,526,056 B1 * | 1/2020 | Hakki | F03D 1/025 |
| 11,225,941 B2 * | 1/2022 | Taber | F03B 13/06 |
| 2025/0042529 A1 * | 2/2025 | Seah | B63B 1/107 |

* cited by examiner

*Primary Examiner* — Joseph Ortega
(74) *Attorney, Agent, or Firm* — Erise IP, P.A.

(57) ABSTRACT

Offshore floating structure may include one or more mooring lines coupled to an elongated base for anchoring the elongated base to a sea floor. Offshore floating structure may further include a mounting platform coupled to the elongated base and configured to removably couple one or more power support components for supporting one or more offshore operations. The one or more power support components may comprise one or more renewable energy power sources, one or more alternative power sources, one or more power storage systems configured to store and provide energy generated from the one or more renewable energy power sources or the one or more alternative power sources, and one or more electric charging stations configured to receive the energy generated from the one or more renewable energy power sources or the one or more alternative power sources. Offshore floating structure may be manually, remotely, and/or autonomously operated.

20 Claims, 5 Drawing Sheets

(51) Int. Cl.
*H02S 10/20* (2014.01)
*H02S 10/40* (2014.01)
*H02S 40/10* (2014.01)

OFFSHORE FLOATING STRUCTURE FOR OFFSHORE POWER OPERATIONS

BACKGROUND

1. Field

Embodiments of the present disclosure relate to offshore floating structures. More particularly, embodiments of the present disclosure relate to offshore floating structures for supporting a plurality of power delivery mechanisms.

2. Related Art

Offshore sea operations face significant challenges in power delivery and mobility, particularly in remote areas far from shore-based energy sources. Delivering power offshore is logistically complex, as transporting heavy structures over long distances requires extensive resources. Additionally, a stable power supply is crucial for subsea activities like oil and gas drilling, as well as for the growing fleet of hybrid-electric sea vessels, which often must return to shore-based energy farms to recharge. Current offshore structures are typically purpose-built for subsea oil and gas operations, limiting the versatility and application of the offshore structures to the specific needs of subsea oil and gas operations. An offshore structure is needed that supports additional needs of offshore operations such as servicing equipment, functioning as a workstation, providing temporary power, or fueling and charging sea vessels. To support these varied needs of offshore operations, a modular and lighter structure is needed-one that is mobile, easier to deploy, and capable of integrating multiple power sources to maximize energy efficiency. Moreover, a structure is needed that can be reused and adapted over time to different operational needs, expanding the scope of offshore support capabilities.

SUMMARY

Embodiments of the present disclosure solve the above-mentioned problems by providing a mobile and reusable offshore floating structure configured to mount replaceable structures for meeting different needs of offshore sea operations. The offshore floating structure may be configured to support one or more offshore sea operations such as power generation, power storage, power delivery, and equipment servicing.

In some aspects, the techniques described herein relate to an offshore semi-submersible floating structure configured for providing support to offshore operations, the offshore semi-submersible floating structure including: an elongated base; one or more mooring lines coupled to the elongated base for anchoring the elongated base to a sea floor; a mounting platform coupled to the elongated base; and one or more power support components removably coupled to the mounting platform, the one or more power support components including: one or more power sources configured to generate energy; one or more power storage systems configured to store energy generated from the one or more power sources; and one or more electric charging stations configured to receive the energy generated from the one or more power sources or stored in the one or more power storage systems.

In some aspects, the techniques described herein relate to an offshore semi-submersible floating structure configured for providing support to offshore operations, the offshore semi-submersible floating structure including: an elongated base; one or more mooring lines coupled to the elongated base for anchoring the elongated base to a sea floor; a mounting platform coupled to the elongated base; and one or more power support components removably coupled to the mounting platform, the one or more power support components including: one or more wind turbines; one or more solar panels; one or more wave energy converters; one or more fuel cells; one or more batteries configured to store energy generated from the one or more wind turbines, the one or more solar panels, the one or more wave energy converters, and the one or more fuel cells; one or more electric charging stations configured to receive the energy generated from the one or more wind turbines, the one or more solar panels, the one or more wave energy converters, the one or more fuel cells, or the one or more batteries; and one or more fuel storage tanks configured to provide fuel to the one or more fuel cells.

In some aspects, the techniques described herein relate to an offshore semi-submersible power-generation system configured for providing support to offshore operations, the offshore semi-submersible power-generation system including: a floating structure subsystem including: an elongated base; and a mounting platform coupled to the elongated base; a power-generating subsystem removably coupled to the mounting platform, the power-generating subsystem including: one or more renewable energy power sources, wherein the one or more renewable energy power sources are at least one or more solar panels; and one or more alternative power sources, wherein one or more fuel storage tanks are configured to provide fuel to the one or more alternative power sources; a power storage subsystem removably coupled to the mounting platform, including: one or more power storage systems configured to store energy generated from the one or more renewable energy power sources or the one or more alternative power sources; a power-providing subsystem removably coupled to the mounting platform, including: one or more electric charging stations configured to receive the energy generated from the one or more renewable energy power sources or the one or more alternative power sources or stored in the one or more power storage systems; and a centralized energy management subsystem removably coupled to the mounting platform, including: a control center configured to control a distribution of the energy generated from the power-generating subsystem to the power storage subsystem and the power-providing subsystem.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
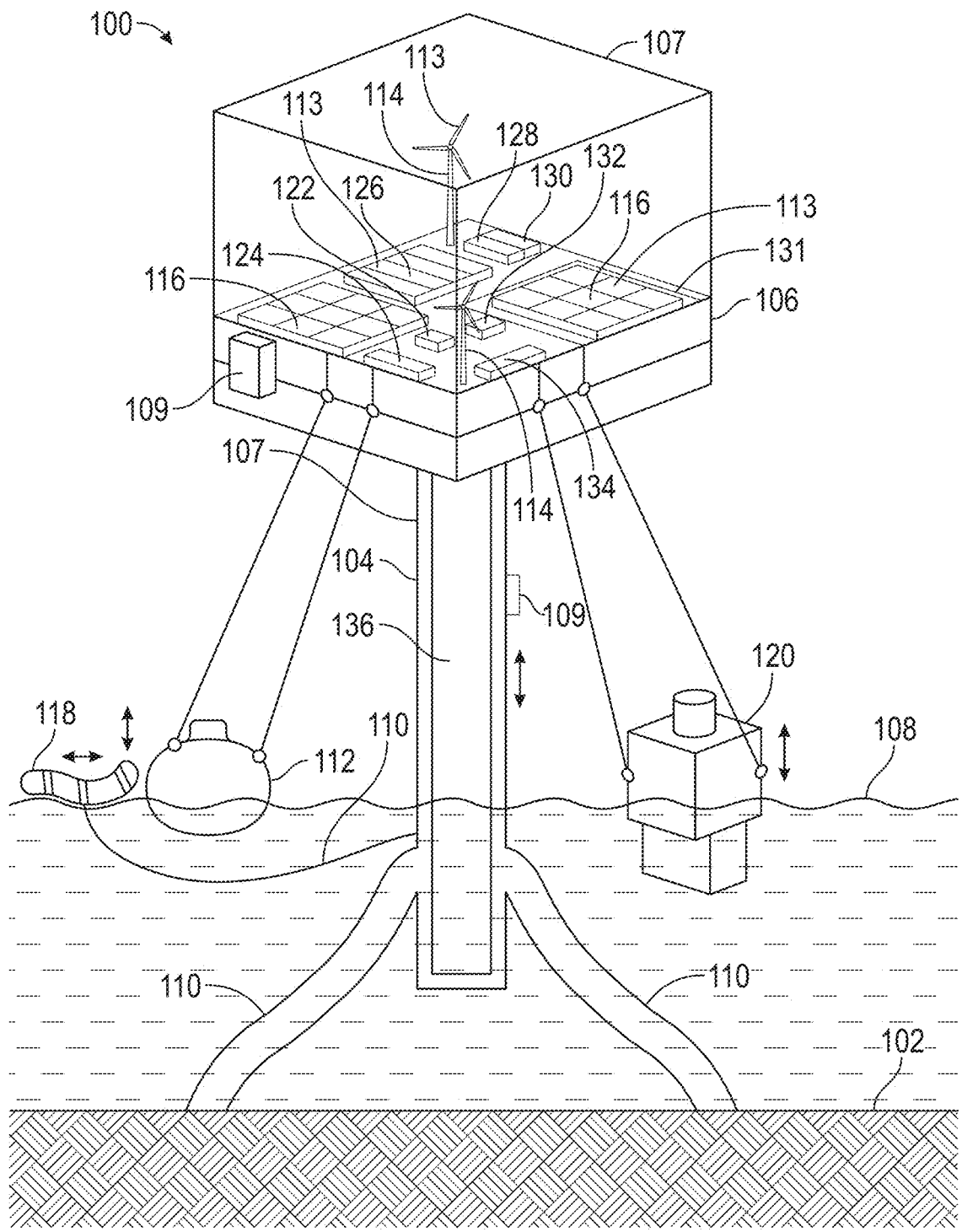
FIG. 1 illustrates an exemplary embodiment of a floating structure.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

In this description, references to "coupled," "couple," "attach," "attached," or similar terms are used to describe a physical or functional connection between two or more components, elements, or structures. This connection may be direct or indirect, allowing for various types of attachment, linkage, or association. For example, one component may be "coupled" to another via intermediate elements, connectors, or mechanisms that facilitate the interaction, transfer, or alignment of the coupled components. The coupling may be fixed, allowing no relative movement, or flexible to accommodate varying degrees of movement or adjustment. These terms are intended to encompass both permanent and removable connections, as well as rigid and adjustable couplings, unless otherwise specified.

Embodiments of the present disclosure relate to offshore floating structures configured for ease of access by sea vessels and ease of transportation from one offshore location to another offshore location. In additional embodiments, the offshore floating structures are configured for mounting one or more components for meeting different needs of offshore sea operations, such as power needs. For example, a variety of distinct types of power support components may be removably mounted on the offshore floating structure to provide a reliable power source for offshore operations. For instance, power support components such as wind turbines, solar panels, wave energy converters, fuel cells, generators, batteries, ultracapacitors, fuel tanks, charging stations, storage compartments, or control centers may be mounted on the offshore floating structure. Further, any one of the power support components may be removably coupled to the offshore floating structure via a modular station configured for mechanically and/or electrically coupling to any one of the power support components. The modular stations allow any one of the power support components to be reused, reconfigured, and/or replaced with other newer or repurposed power support components to provide continuous power support to offshore operations at various offshore locations. In addition, the power support components may be remotely or autonomously operated. The power support components may be further used in combination with additional equipment such as safety devices, cameras, sensors, satellite communication devices, and control centers for providing a power-providing offshore structure that is safe for operators to use and alerts operators to intruders.

The modular stations advantageously allow the operational life of the offshore floating structure to be increased as compared to prior art structures that lack modularity and removable coupling of power support components. For example, transporting offshore floating structures to remote offshore locations is logistically complex. By enabling the offshore floating structure to be modular and reusable with different power support components, the offshore floating structure may adapt to different offshore operational needs over time. This type of adaptability allows the offshore floating structure to support multiple projects or phases of offshore operations without the need for transporting an entirely new infrastructure (such as an entirely new offshore floating structure) with newly mounted power support components, making the presently disclosed offshore floating structure more efficient as compared to a structure that is not configured to be modular or to a structure that is permanently mounted to and located at a sea location.

Additionally, the offshore floating structure is removably coupled (e.g., mounted or attached) to one or more moorings to stabilize the offshore floating platform and secure it to a sea floor to prevent drifting. Removably coupling the offshore floating structure to moorings allows additional modular offshore floating structures to be disposed at other remote offshore locations that already have one or more moorings anchored to a sea floor (e.g., ocean floor). The offshore floating structure can advantageously be moved from one location in the sea to another location. For example, in contrast to traditional offshore platforms, the present offshore structure can be made of lighter materials such as a composite steel material or carbon fiber for improved floating and transportation capabilities. In another example, unlike permanent offshore platforms, the present mobile structure of the offshore floating structure can be tethered to a ship, helicopter, or other motored vehicle, and moved to another sea location. This is especially advantageous because the offshore floating structure may be used to provide charging capabilities or fuel to sea vessels at different offshore locations.

FIG. 1 illustrates an exemplary embodiment of an offshore floating structure 100. In some embodiments, floating structure 100 is disposed in a sea environment (e.g., any deep-water location such as an offshore location of the ocean), such as at surface level in a deep-sea environment far away from shore. For example, floating structure 100 may be disposed at a surface level several miles above a sea floor 102 (e.g., ocean floor). Floating structure 100 is configured to provide support to offshore operations. For example, floating structure 100 may be used to support oil and gas drilling in deep waters by providing power to sea vessels or equipment used during the drilling operations. In another example, floating structure 100 may be used to aid in the installation and maintenance of subsea equipment and pipelines.

Floating structure 100 comprises base 104 coupled to mounting platform 106. Base 104 may be coupled to mounting platform 106 via different configurations. For example, in some embodiments, base 104 is coupled to mounting platform 106 by a bolted flange connection or welded joints. In some embodiments, base 104 and mounting platform 106 are removably coupled such that base 104 and mounting platform 106 may be removed and replaced. In other embodiments, base 104 and mounting platform 106 are a monolithic structure.

In some embodiments, floating structure 100 is semi-submersible. For example, floating structure 100 may be partially submersed in the sea such that a portion of base 104 or mounting platform 106 is above sea level 108 while another portion of base 104 or mounting platform 106 is below sea level 108. In other embodiments, base 104 is fully submersed while mounting platform 106 is partially submersed. As discussed below, floating structure 100 is configured to be secured (e.g., anchored) to sea floor 102 by moorings such that floating structure 100 is prevented from freely drifting or floating aimlessly.

In some embodiments, base 104 and mounting platform 106 are formed of at least a steel material such as structural steel or stainless steel. A certain percentage, such as at least 50%, at least 75%, or at least 90% of floating structure 100 may be formed of a steel material. In other embodiments, base 104 and mounting platform 106 are formed by at least one of steel, carbon fiber, concrete aluminum, polyethylene, or any combination thereof. In some embodiments, base 104 and mounting platform 106 are formed of at least a composite material. For example, base 104 and mounting platform 106 may be formed of a composite steel comprising a steel material and a non-steel material. For instance, base 104 and mounting platform 106 may be formed of at least steel and a polymer material. A certain percentage, such as at least 50%, at least 75%, or at least 90% of floating structure 100 may be formed of a composite material. In some embodiments, base 104 is formed of a material partially or entirely different from which the material mounting platform 106 is formed. Using a composite material for base 104 and/or mounting platform 106 allows floating structure 100 to be lighter than if floating structure 100 were formed partially or entirely of a steel material. A reduced weight in the structure of floating structure 100 advantageously allows for the floating structure 100 to be more easily transported and moved as compared to floating structures formed of heavier materials that are harder to transport or move. For example, using a lighter material makes it easier to transport floating structure 100 from an onshore or near-shore location (e.g., where floating structure 100 is assembled) to a remote offshore location several or many miles away from shore. Floating structure 100 may be transported by vessels such as tugboats, barges (e.g., pontoon barges), cargo ships, submersible ships, or semi-submersible ships from an onshore or near-shore location to an offshore location.

In some embodiments, base 104 is a cylindrical shape. For example, base 104 may be a cylindrical shape extending from a surface of the mounting platform 106. The base 104 may be an elongated cylinder with a circular cross-section and a long, straight axis. In other embodiments, base 104 is an elongated rectangular with a rectangular cross-section and a long, straight axis. Further, embodiments are contemplated in which base 104 may take any shape or size with any height, width, or depth.

In some embodiments, mounting platform 106 is a rectangular shape. In other embodiments, mounting platform 106 is a cylindrical shape. Further, embodiments are contemplated in which mounting platform 106 may take any shape or size with any height, width, or depth.

In some embodiments, floating structure 100 includes a protective cover 107 shielding floating structure 100. For example, mounting platform 106 may be partially or fully covered by protective cover 107 that shields mounting platform 106 and any structures or equipment supported by mounting platform 106 from harsh weather conditions such as waves, rain, or sun exposure. In some embodiments, protective cover 107 is a canopy formed of steel or aluminum. In other embodiments, protective cover 107 is a fabric cover formed of thermoplastic material that is UV-resistant and waterproof. In other embodiments, protective cover 107 is used to cover base 104 from harsh subsea conditions.

In some embodiments, base 104 and/or mounting platform 106 includes one or more dampers 109 for enhancing the stability of floating structure 100 and reducing the impact of external forces, such as waves, wind, and ocean currents on floating structure 100. For example, dampers 109 may include hydraulic dampers, air dampers, inertial dampers, elastomeric dampers, or any combination thereof. Dampers 109 help floating structure 100 absorb and dissipate energy, maintaining the position and minimizing the movement of floating structure 100 while floating structure 100 is being used to support offshore operations.

In some embodiments, floating structure 100 includes one or more moorings 110 (e.g., mooring lines) that secure floating structure 100 to sea floor 102 such that floating structure 100 does not float away from a desired location within the sea. Moorings 110 may be formed of material such as steel or a composite material. For example, moorings 110 may be steel ropes or composite ropes formed from materials such as polyethylene, nylon, or polyester. Moorings 110 may further include floating insets (e.g., buoys or floats) or weights for adjusting the floatation or anchoring of moorings 110. Moorings 110 may extend from base 104 or mounting platform 106 to one or more anchoring points on sea floor 102 to stabilize and secure floating structure 100 in place. For example, moorings 110 may be anchored to sea floor 102 using various types of anchors, such as drag-embedded anchors, suction anchors, or pile anchors. Moorings 110 may be removably coupled to base 104 and/or mounting platform 106 such that moorings 110 may be removed from the floating structure 100 and replaced, if needed. The moorings 110 may be removably coupled to base 104 via padeyes, fairleads, swivel connectors, and similar attachment devices. In another embodiment, moorings 110 are permanently coupled to base 104 and/or mounting platform 106 such that moorings 110 cannot be removed from the floating platform or replaced.

In some embodiments, base 104 or mounting platform 106 is coupled to moorings 110 using chains or cable connectors. In other embodiments, moorings 110 may be connected to base 104 or mounting platform 106 using fairleads, swivels, or tensioner devices in combination with chains or cable connectors to guide and secure moorings 110, allowing for slight tensioning adjustments to maintain stability as forces (such as waves or ocean currents) applied to floating structure 100 change. Various mooring systems may be used to secure floating structure 100 to sea floor 102 such as a spread mooring system, taut leg mooring system, or a catenary mooring system.

In some embodiments, floating structure 100 includes one or more buoys 112. For example, buoys 112 may be coupled to base 104 or mounting platform 106 via moorings 110, chains, ropes, or any combination thereof. In other embodiments, buoys 112 are coupled to both sea floor 102 and floating structure 100. For example, buoys 112 may be coupled to sea floor 102 at one or more anchoring points while also being coupled to base 104 or mounting platform 106 of floating structure 100 at the same time.

Buoys 112 are used for various purposes in relation to floating structure 100. For example, buoys 112 may be a navigation, positioning, or marker buoy remaining in proximity to floating structure 100. In another embodiment, buoys 112 are stabilizing buoys used for providing localized buoyancy and enhanced stability to floating structure 100, preventing excessive movement of floating structure 100. In a further example, buoys 112 may be coupled to moorings 110, cables, chains, or ropes in use with floating structure 100 to prevent moorings 110, cables, chains, or ropes from dragging along sea floor 102. In an even further example, buoys 112 are used to prevent hoses, cables, or hawsers connected to floating structure 100 and subsea equipment from dragging along sea floor 102. For example, buoys 112 may be used to hold hoses that deliver oil or gas produced from an offshore drilling operation to one or more vessels configured to transport the produced oil or gas. In some embodiments, buoys 112 may be equipped with cables, hoses, or pipelines connected to a power and/or fuel system of floating structure 100 such that buoys 112 are used to refuel or electrically charge one or more sea vessels. For example, buoys 112 may be used to deliver oil or electric energy from a fuel storage tank and/or power storage system (as discussed below) mounted on floating structure 100 to one or more sea vessels.

In other embodiments, floating structure 100 is used to support buoys 112 external to floating structure 100. For example, an external buoy 112 used in an offshore operation by one or more sea vessels may be coupled to floating structure 100 such that the external buoy 112 is serviced at a location offshore. Being able to service a buoy in remote areas of the sea advantageously increases the efficiency of offshore operations. For example, servicing vessels may travel shorter distances to floating structure 100, as compared to longer distances located near the shore, to service equipment used in offshore operations such as external buoys 112. In some embodiments, buoys 112 are serviced after being hoisted onto mounting platform 106 where the servicing is done on a stable, level platform.

As discussed above, embodiments of the present disclosure provide a floating structure 100 having a mounting platform 106 comprising a plurality of modular stations. Each modular station is configured to have mounted thereon a power support component. "Power support component" as used herein includes any component for generating, storing, charging, or otherwise disseminating power. Exemplary power support components include any power generating component, any power storing component, and/or any electric charging component. Each power support component is configured to be modular, such as having the ability to be reused with the modular stations and operable to be mounted to mounting platform 106 and replaced, as needed.

In embodiments, the power support components 113 supported by floating structure 100 for supporting offshore operations include at least one power-generating component. In embodiments, the power-generating component may be a renewable energy power source or an alternative power source. In embodiments, renewable energy power sources include wind turbines 114, solar panels 116, wave energy converters (WECs), ocean thermal energy conversion (OTEC) systems, tidal stream generators, or any other currently known or later developed power source for generating renewable energy. In embodiments, alternative energy power sources include fuel cells 122, generators 124, or any other currently known or later developed power source, other than the one or more renewable energy power sources discussed above, for generating energy. In embodiments, the power support components 113 may be one or more power storage systems 126 configured to store energy generated by the power-generating components. In embodiments, power storage systems 126 may be one or more batteries, one or more ultracapacitors, or any other type of power storage system currently known or later developed for storing electricity. In embodiments, the power support components 113 may be one or more fuel storage tanks 128 configured to store fuel for the alternative energy power sources. In embodiments, power support components 113 may be one or more charging stations 130. In embodiments, charging stations 130 include electric charging stations configured to electrically charge offshore operations such as one or more sea vessels.

The power support components 113 may be removably coupled to mounting platform 106. For example, any of the power support components 113 may be removed or replaced by any other power support component 113 via the modular stations 131. The modular stations 131 are designed with the flexibility to accommodate any of the power support components 113. For example, the modular stations 131 include the electrical and mechanical connections necessary for mounting power support components 113 to mounting platform 106. For instance, any of modular stations 131 are configured for mounting wind turbines 114, solar panels 116, fuel cells 122, generators, 124, power storage systems 126, fuel storage tanks 128, or charging stations 130 using standardized mounting points and connections that ensure secure coupling of power support components 113 for supporting power-generating operations of floating structure 100.

Power support components 113 may be mounted to modular stations 131 with quick-release clamps or latches, bolt and flange connections with detachable inserts, shear pin coupling, twist-lock fasteners, hydraulic or pneumatic clamps, guided slide and lock systems, or any other currently known or later developed coupling device that is configured to removably couple power support components 113 to modular stations 131. Coupling power support components 113 to floating structure 100, where power support components 113 are operable to be removed and replaced from mounting platform 106, allows floating structure 100 to be reused with any number of additional power support components 113 being used to support one or more offshore operations. For example, removably coupling a wind turbine 114 to modular station 131 allows the wind turbine 114 to be removed and replaced with additional wind turbines 114 as many times as necessary for providing power to one or more offshore operations via the additional wind turbines 114.

Any number of renewable energy power sources may be removably coupled to mounting platform 106. In some embodiments, only one of the different types of renewable energy power sources is coupled to mounting platform 106 at one time. For example, only one or more wind turbines 114 may be coupled to mounting platform 106. In another example, only one or more solar panels 116 may be coupled to mounting platform 106. In even a further example, only one or more WECs may be coupled to mounting platform 106.

In some embodiments, any number of different (e.g., distinct) types of the renewable energy power sources may be coupled to mounting platform 106 at the same time. For example, a variety of distinct types of power-generating components may be removably coupled to the offshore floating structure to provide a reliable power source for offshore operations. In some embodiments, floating structure 100 is configured to support more than one distinct type of renewable energy power source at the same time. For example, mounting platform 106 may be configured to support at least one wind turbine 114, at least one solar panel 116, and at least one WEC at the same time. In another example, twenty wind turbines 114, twenty solar panels 114, and twenty WECs may be coupled to mounting platform 106 at the same time.

Utilizing a combination of at least wind, solar, and wave energy power sources on an offshore platform offers significant advantages by creating a resilient renewable energy system. For instance, since wind, solar, and wave energy sources each operate optimally under different conditions; solar panels generate electricity during sunny periods, wind turbines harness power from breezy conditions, and wave energy converters capitalize on dynamic ocean currents. This multi-faceted approach ensures a more reliable and continuous energy generation to be used by offshore operations. For instance, when solar energy generation by solar panels 116 is low during cloudy days or at night, wind energy generation by wind turbines 114 and wave energy generation by the WECs compensate for the low solar energy generation, thus maintaining consistent power output to one or more offshore operations. The use of renewable energy power sources with floating structure 100 also reduces reliance of offshore operations on fossil fuels, while distributing use over a variety of available natural resources in the offshore environment such as waves, wind, and sunlight.

In some embodiments, the one or more renewable energy power sources may be low-power renewable energy power sources. For example, wind turbines 114, solar panels 116, or the WECs may be configured to generate a power output between a few watts (W) of power and a few kilowatts (KW) of power. For instance, wind turbines 114, solar panels 116, or the WECs may be configured to produce 50 W-100 KW of power. Advantageously, a floating structure 100 supporting renewable energy power sources configured to generate a power output between a few watts of power and a few kilowatts of power provides a power source for offshore operations equipment that only requires a few watts or a few kilowatts of power. For example, low-power renewable energy power sources (e.g., kW of power) may meet localized, small-scale needs of offshore operations that have equipment requiring kW of power instead of megawatts (MW) of power. Additionally, low-power renewable energy power sources may be easier to install and require less maintenance than high-power renewable energy power sources.

In some embodiments, the renewable energy power sources may be high-power renewable energy power sources. For example, wind turbines 114, solar panels 116, or the WECs may be configured to generate a power output between a megawatt of power and a few hundred megawatts of power. For instance, wind turbines 114, solar panels 116, or the WECs may be configured to produce 1 MW-100 MW of power. High-power renewable energy power sources (e.g., MW of power) may supply grid-scale, large-scale power to large offshore operations with equipment requiring MW of power instead of kW of power. In some embodiments, floating structure 100 is used to support large-scale renewable power source systems. For example, a wind farm (e.g., wind power plant), solar farm (e.g., solar power plant), and/or tidal energy plant may be removably coupled to mounting platform 106.

In some embodiments, wind turbines 114 are removably coupled to mounting platform 106 via a central turret or pedestal that is elevated from a surface of mounting platform 106 (e.g., a surface of modular station 131). In other embodiments, one or more wind turbines 114 are removably coupled to mounting platform 106 via base plates or frames that are welded or bolted to the surface of mounting platform 106.

Further, autonomous and/or remote equipment such as cameras, sensors, and/or robotic systems may be used for maintaining and inspecting the renewable energy power sources. For example, wind turbines 114 may be autonomously maintained and inspected using cameras and/or sensors. For instance, the cameras and/or sensors may be attached to wind turbines 114 or mounting platform 106 to conduct visual inspections of the turbine blades, towers, and other components of wind turbines 114 to identify issues such as overheating or malfunctioning parts before wind turbines 114 fail. Additionally, robotic systems may be attached to wind turbines 114 for inspecting and cleaning wind turbines 114. Further, autonomous and/or remote means using equipment such as cameras, sensors, and/or robotic systems for maintaining and inspecting wind turbines 114 prevents the need for human operators to manually climb wind turbines 114 on top of mounting platform 106, minimizing safety risks and accidents.

In some embodiments, the WECs are removably coupled to base 104. For example, the WECs may be attached to base 104 via one or more moorings 110, ropes, cables, pipes, or a combination thereof. In some embodiments, the WECs are removably coupled to mounting platform 106. For example, the WECs may be coupled to mounting platform 106 via moorings 110, ropes, cables, pipes, or combination thereof.

In some embodiments, the WECs are attenuator WECs 118. For example, attenuator WECs 118 may be a snake-like WEC (e.g., Pelamis WEC) that includes one or more cylindrical segments connected by hinged joints designed to operate in open ocean environments and harness substantial wave energy for converting to electrical power. In some embodiments, attenuator WECs 118 float on the surface of the ocean, utilizing buoyant materials and structures that keep attenuator WECs 118 afloat while allowing attenuator WECs 118 to flex and move with wave action. The attenuator WECs 118 may be coupled to buoys 112, base 104, and/or mounting platform 106 via moorings 110, ropes, or cables. For example, floating structure 100 may provide the necessary structural support for attenuator WECs 118, anchoring attenuator WECs 118 securely to base 104 or mounting platform 106 while allowing attenuator WECs 118 to float and move with the waves.

In some embodiments, the WECs are vertical-axis WECs 120. Vertical-axis WECs 120 are devices designed to capture energy from ocean waves, utilizing a vertical axis to generate power. Unlike horizontal-axis WECs such as attenuator WECs 118, which are typically aligned with the direction of the waves, vertical-axis WECs 120 harness energy regardless of the wave direction. In some embodiments, vertical-axis WECs 120 includes an oscillating water column, turbine, and/or generator for harnessing and converting energy from waves coming from any direction. In other embodiments, vertical-axis WECs 120 include a support ring (see support ring 206 discussed below in FIG. 2). The support ring of vertical-axis WECs 120 may be used for maintaining an optimal orientation of the vertical-axis WECs 120 relative to incoming waves, mounting energy conversion equipment (e.g., generators or turbines) onto vertical-axis WECs 120, or connecting moorings 110 to vertical-axis WECs 120. In some embodiments, vertical axis WECs 120 may be coupled to buoys 112, base 104, and/or mounting platform 106 via moorings 110, ropes, or cables. For example, floating structure 100 may provide the necessary structural support for vertical-axis WECs 120, anchoring vertical-axis WECs 120 securely to base 104 or mounting platform 106 while allowing vertical-axis WECs 120 to be vertically displaced.

In some embodiments, the WECs includes both an attenuator WEC 118 and a vertical-axis WEC 120. Having the ability to mount the WECs directly to mounting platform 106 of a lighter, mobile floating structure 100 allows the WECs to be relocated to other offshore locations to optimize energy capture for offshore operations based on varying wave conditions. Further, the ability to mount the WECs directly to mounting platform 106 without having to anchor the WECs to sea floor 102 advantageously allows the WECs to more easily be moved horizontally or vertically to optimize energy generation. For example, vertical-axis WECs 120 may be configured to be raised and lowered in a vertical direction more easily when coupled to mounting platform 106 as compared to being anchored to sea floor 102. Further, as discussed below, mounting platform 106 may house the power conversion equipment required for generating energy via the WECs.

In some embodiments, solar panels 116 include autonomous maintenance equipment. For example, robotic systems for cleaning solar panels may be attached (e.g., coupled) to solar panels 116. For instance, solar panels 116 may include sensors and/or cameras for detecting panel positions and a surface environment of solar panels 116. In combination with the sensors and/or cameras, the robotic systems may employ cleaning equipment such as brushes, scrapers, liquids, detergents, sprayers, or compressed air for autonomously cleaning solar panels 116. Additionally, the robotic systems may be programmed to operate on a schedule, ensuring solar panels 116 are cleaned at optimal intervals based on weather conditions and environmental factors.

Further, the robotic systems may use the sensors and/or cameras to autonomously inspect solar panels 116 for cracks, discoloration, or similar performance-hindering issues. For example, the robotic systems may utilize thermal imaging cameras for detecting hotspots indicating faulty panels on solar panels 116. In some embodiments, the robotic systems may be remotely operated by a user, where the user may utilize the sensors, cameras, and/or cleaning equipment to clean or inspect solar panels 116. In other embodiments, the robotic systems are used to collect data on the condition of solar panels 116 over time, which helps with predictive maintenance strategies, allowing for timely interventions of solar panels 116 before failures occur.

Using robotic systems to maintain and inspect solar panels 116 is more easily achieved when solar panels 116 are mounted onto a surface that is above sea level 108 as compared to solar panels 116 floating on the surface of the ocean. For example, it is easier for the robotic systems to autonomously or remotely maintain or inspect solar panels 116 that are stationary and not continuously being moved due to forces caused by wind, waves, and/or ocean currents.

Further, robotic systems often use less water than traditional methods used to maintain and inspect one or more solar panels 116. Robotic systems also minimize the need for human workers to climb onto floating structure 100 and navigate solar panels 116, reducing the risk of accidents.

Any number of the types of alternative power sources may be removably coupled to mounting platform 106. In some embodiments, only one of the different types of alternative power sources is removably coupled to mounting platform 106. For example, mounting platform 106 may be configured to support only fuel cells 122. In another example, mounting platform 106 may be configured to support only generators 124.

Fuel cells 122 may be proton exchange membrane fuel cells, solid oxide, fuel cells, alkaline fuel cells, and any other type of fuel cell currently known or later developed for generating electricity. Generators 124 may be diesel generators, gasoline generators, propane generators, biogas generators, and any other type of generator currently known or later developed for generating electricity.

Using alternative power sources in combination with renewable energy power sources is advantageous for floating structure 100 to support one or more offshore operations. For example, fuel cells 122 and/or generators 124 may generate power for offshore operations when one or more renewable energy power sources are not generating enough power required by the respective offshore operations. In another embodiment, generators 124 may be configured to function as back-up generators, providing power to floating structure 100 or offshore operations during power outages.

In some embodiments, power storage systems 126 are lithium-ion batteries, flow batteries, lead-acid batteries, sodium-ion batteries, nickel-based batteries, solid-state batteries, or any other type of battery currently known or later developed for storing electricity. In some embodiments, power storage systems 126 include a hybrid system that combines batteries and ultracapacitors (e.g., hybrid capacitors) to function together.

Power storage systems 126 store energy generated by the power-generating components. For example, power storage systems 126 may store energy generated by wind turbines 114, solar panels 116, attenuator WECs 118, vertical-axis WECs 120, fuel cells 122, or generators 124. Power storage systems 126 are configured to store energy such that the energy is released when power is needed for one or more offshore operations. In some embodiments, power storage systems 126 store energy that is used to power any electrical components housed by floating structure 100 such as a control center, ballast tank, cameras, sensors, or satellite communication devices.

Fuel storage tanks 128 may be located on the surface of mounting platform 106. In another example, fuel storage tanks 128 may be located below the surface of mounting platform 106. In some embodiments, fuel storage tanks 128 are configured to store fuel for the alternative energy power sources. For example, fuel storage tanks 128 may store fuel for fuel cells 122 or generators 124. The stored fuel is used by fuel cells 122 or generators 124 to generate electricity. For instance, fuel cells 122 may include a hydrogen fuel cell, where fuel storage tanks 128 store hydrogen gas to be used by the hydrogen fuel cell. Other examples of fuel that may be stored by fuel storage tanks 128 include natural gas, diesel gas, or liquid fuels such as methanol or ethanol.

Fuel storage tanks 128 and the one or more power-generating components may be connected through a fuel delivery system, such as a piping network, for providing fuel to the alternative energy power sources. For example, fuel may be transported from fuel storage tanks 128 to fuel cells 122 and/or generators 124 via one or more pipes, where one or more valves (e.g., fittings) are used to control the flow of the fuel. The flow of the fuel from fuel storage tanks 128 to the alternative energy power sources may be controlled by a control system for monitoring the fuel levels, the fuel flow rates, and the performance metrics of fuel storage tanks 128. The control system may be remotely or manually controlled. Additionally, the fuel delivery system may include one or more sensors and/or cameras for monitoring and detecting hazards such as leaks to minimize the risk of accidents. Further, the fuel delivery system may include an emergency shut-off system to quickly shut off the flow of fuel being supplied from fuel storage tanks 128.

In some embodiments, fuel storage tanks 128 are configured to store fuel to be provided to offshore operations. For example, fuel storage tanks 128 may store fuels such as diesel gas, natural gas, or petroleum gas to be provided to one or more offshore operations such as sea vessels or drilling operations. In some embodiments, fuel storage tanks 128 are configured to store fuel produced by one or more offshore operations. For example, fuel storage tanks 128 may store oil or gas secured by a nearby offshore oil and gas drilling operation.

Charging stations 130 may be electric charging stations configured to charge offshore operations. For instance, charging stations 130 may be configured to charge one or more sea vessels. Providing sea vessels with access to charging stations 130 in remote parts of the ocean far from shore offers several advantages, particularly as the maritime industry shifts towards more sustainable and efficient practices such as using more sea vessels that are hybrid electric. For example, providing charging stations 130 in offshore locations would allow the batteries of hybrid electric sea vessels to be recharged while at sea, significantly extending the operational range of the hybrid electric sea vessels and reducing concerns about running out of battery power. Additionally, charging stations 130 may support other various offshore operations, such as crew transfers, offshore wind farms, research missions, cargo shipment vessels, and supply vessels, making logistics more manageable for these different types of operations.

In some embodiments, charging stations 130 are electrically connected to the power-generating components such that charging stations 130 draw energy generated by the power-generating components. For example, charging stations 130 may be electrically connected (e.g., power cables) to power storage systems 126 such that power storage systems 126 supply charging stations 130 with the requisite energy input for providing energy to offshore operations. Charging stations 130 may include hardware such as transformers, switchgear, charge controllers, power inverters, or control systems for ensuring the voltage and current supplied to sea vessels or offshore equipment meet the specific input requirements by the sea vessels or offshore equipment. In some embodiments, charging stations 130 include power distribution cables, such as underwater cables, for delivering energy from charging stations 130 to sea vessels or offshore equipment. Charging stations 130 may include sensors for automatically or remotely controlling or monitoring charging stations 130 (e.g., emergency shutdown).

In some embodiments, power support components 113 supported by floating structure 100 include one or more storage compartments 132. For example, one or more storage compartments 132 may be a shipping container, mobile storage units, storage tanks, barrels, or any other currently known or later developed storage compartment configured to store materials or equipment. The storage compartments 132 are configured to store items or equipment relevant to floating structure 100 or offshore operations. For example, storage compartments 132 may be used to store tools and maintenance equipment for servicing power support components 113 removably coupled to floating structure 100. In another example, storage compartments 132 may be used to store tools or equipment used to perform various offshore operations. For example, storage compartments 132 may be used to store offshore operation equipment such as satellite communication devices, pumps, pipes, lifeboats, drills, waste, or food. In another example, storage compartments 132 may be additional tanks for storing different types of fuel used by fuel storage tanks 128 or ballasting system 136.

In some embodiments, power support components 113 supported by floating structure 100 include one or more control centers 134. For example, control centers 134 may be configured to manage (e.g., control the distribution of) the power and energy generated by and delivered between the power-generating components, power storage systems 126, fuel storage tanks 128, and charging stations 130. For example, control centers 134 is a centralized hub for controlling and managing the power and energy generated by floating structure 100. For instance, control centers 134 may be configured to adjust the operation of the power-generating components, power storage systems 126, fuel storage tanks 128, or charging stations 130 based on demand, generation capacity, and storage levels, ensuring optimal performance and delivery of power to offshore operations.

In some embodiments, control centers 134 are configured to manage the distribution of electricity from the different power sources to meet the demands of connected loads, including charging stations 130, for providing power to sea vessels or offshore equipment. Additionally, control centers 134 may be configured to track fuel levels in fuel storage tanks 128 and signal when refueling is necessary, helping to prevent shortages that could impact the power generation capacity of floating structure 100.

In some embodiments, control centers 134 are configured to manage the charging and discharging cycles of power storage systems 126, ensuring that power storage systems 126 are charged during periods of low power demand or high-power generation and discharged when power demand is high or power generation is low. Control centers 134 may be operated manually or automatically. For example, control centers 134 may include a user-friendly interface with dashboards displaying real-time data, alerts, and system statuses to be manually operated by an operator physically located on mounting platform 106. In other embodiments, control centers 134 are operated remotely by an operator not physically located on mounting platform 106. For example, the operator may remotely operate control centers 134 from an offsite location such as an onshore location or a sea vessel. In even further embodiments, control centers 134 are automated, where control centers 134 are controlled based on feedback data from sensors associated with power support components 113, as discussed above.

In some embodiments, power support components 113 supported by floating structure 100 include satellite communication devices. For example, one or more antennas may be removably coupled to mounting platform 106 for establishing reliable wireless communication links between power support components 113 of floating structure 100, and nearby sea vessels. For example, the antennas may be configured to connect to satellite networks and establish communication with operators located at onshore locations or on nearby sea vessels. The antennas may transmit data from sensors and monitoring equipment located on mounting platform 106 to onshore locations or sea vessels. In some embodiments, the antennas are used to receive commands sent from locations external to floating structure 100, allowing for remote adjustments and operational control of control centers 134 by remote users. Additionally, the antennas may be used to communicatively connect and operate one or more devices deployed throughout floating structure 100, such as sensors or cameras, for providing real-time sensor data and/or visual imaging of the environment on or around floating structure 100 to control centers 134, an onshore location, or a nearby sea vessel. Control centers 134 may be fully autonomous such that floating structure 100 may generate, store, and provide power to offshore operations without user input. In some embodiments, floating structure 100 is semi-autonomously operated where control centers 134 are manually and/or remotely adjusted via user input to intervene in the autonomous operation of floating structure 100.

In some embodiments, the antennas include sensors for monitoring environmental conditions. For example, the antennas may be configured to transmit weather data (e.g., temperature, humidity, wind speed, or barometric pressure) collected by the sensors. The transmitted weather data may be transmitted to a monitoring station (e.g., weather station) located onshore or on another sea vessel. The antennas enable real-time monitoring of weather conditions, allowing operators to respond quickly to changing environmental factors that may affect nearby offshore operations being supported by floating structure 100.

In some embodiments, power support components 113 coupled to floating structure 100 include safety devices. For example, surge protectors may be installed at connection points between power support components 113 for preventing damage from unexpected surges (e.g., lighting strikes or voltage spikes). In some embodiments, fire suppression systems are installed throughout mounting platform 106 to detect and extinguish fires due to electrical issues, overheating, or mechanical issues with the power support components 113. Other safety devices include circuit breakers, fuses, temperature sensors, gas detectors, safety pumps, leak detection systems, and automated shutdown and restart systems such that floating structure 100 may be safely operated in an autonomous, remote, or manual manner.

In some embodiments, one or more surveillance cameras are located throughout floating structure 100. For example, cameras may be mounted to a structure such as a pole, antenna, or other component located on mounting platform 106 for providing real-time visual feedback of the environment of floating structure 100. For instance, the cameras may be located near perimeter points, entry points, and exit points of mounting platform 106 for monitoring activity on or around floating structure 100. The cameras may be night vision cameras or thermal cameras for detecting components on mounting platform 106 that are overheating.

The power support components 113 discussed above may be arranged on mounting platform 106 in any desired pattern or combination. In some embodiments, the power support components 113 are arranged based on the type of component. For example, wind turbines 114 may be located on the corners of mounting platform 106 because wind turbines 114 may not require as much mounting space as, for example, solar panels 116 require. In some embodiments, solar panels 116 are arranged on mounting platform 106 such that a solar panel grid (e.g., solar array) is formed. The solar array includes at least two of the solar panels 116 electrically interconnected to generate a larger output of electricity than what only one of the solar panels 116 would generate. In some embodiments, fuel cells 122 and/or generators 124 are placed in close proximity to fuel storage tanks 128 such that a short distance is required to transfer fuel from fuel storage tanks 128 to fuel cells 122 or generators 124.

In some embodiments, floating structure 100 includes a ballasting system 136 configured to raise or lower floating structure 100 relative to sea level 108. For example, ballasting system 136 may be integrated within base 104. For instance, ballasting system 136 may be a ballast tank integrated within base 104 that raises or lowers floating structure 100 by managing the amount of water that is located within the ballast tank. Ballasting system 136 may include pumps or valves configured to allow water from the surrounding sea to flow into ballasting system 136. In some embodiments, mounting platform 106 is raised or lowered remotely via ballasting system 136. For example, the rate at which the ballast tank of ballasting system 136 is filled with water may be remotely controlled by an operator via one or more sensors. For instance, ballasting system 136 may be communicatively coupled to one or more control centers 134 such that an operator manually or remotely controls ballasting system 136 for raising and lowering mounting platform 106. Ballasting system 136 may be any type of ballasting system such as a gravity ballast system, water ballast system, air ballast system, or hydraulic ballast system.

The ability to raise and lower mounting platform 106 is advantageous for maintaining the stability of floating structure 100, such as managing the center of gravity and buoyancy of floating structure 100 to reduce the risk of capsizing. Further, raising or lowering mounting platform 106 may make mounting platform 106 more easily accessible for loading and unloading supplies, personnel, and equipment, making logistical operations more efficient and safer for using floating structure 100 to support offshore operations. As discussed above, floating structure 100 is designed to support one or more modular power support components 113 that may be removed and replaced. Thus, raising and lowering mounting platform 106 allows for easy installation or removal of these modular structures as needed. For example, if power storage systems 126, such as one or more batteries, need to be replaced due to performance issues, power storage systems 126 may be removed (e.g., by crane) from mounting platform 106 by lowering mounting platform 106 closer to sea level 108 for easier removal of power storage systems 126 onto a sea vessel.

Figure 2:
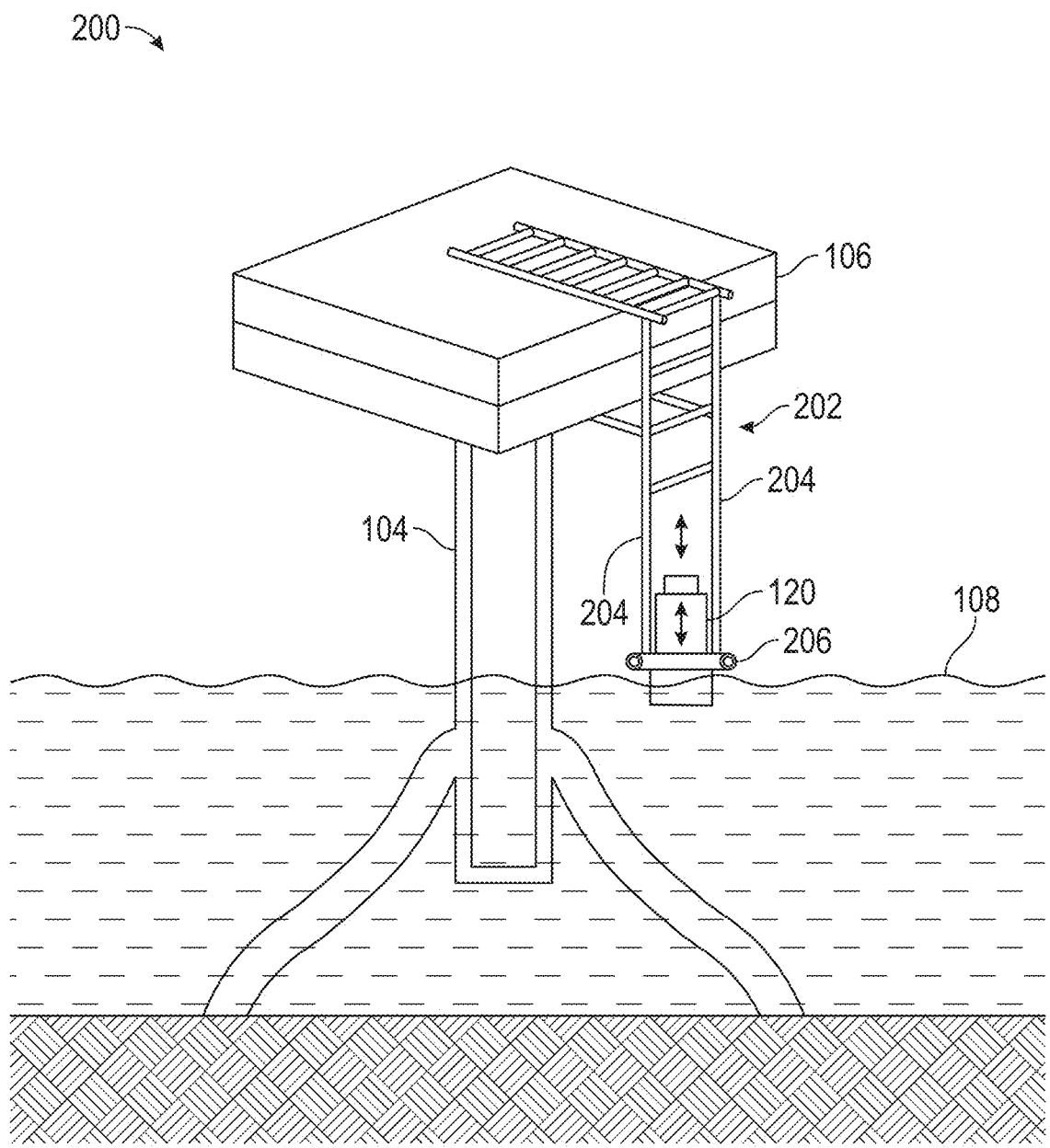
FIG. 2 illustrates an exemplary embodiment of a floating structure including a wave energy converter support structure.

FIG. 2 illustrates an exemplary embodiment of a floating structure 200 including a WEC support structure 202. Floating structure 200 has all features and aspects of floating structure 100 discussed above in FIG. 1. In some embodiments, floating structure 200 includes one or more WEC support structures 202 configured to provide enhanced stability to vertical-axis WECs 120. For example, WEC support structure 202 may include one or more pipes 204 and a support ring 206. For instance, pipes 204 may be removably coupled to base 104 and/or mounting platform 106. Pipes 204 may also be coupled to support ring 206. Support ring 206 may encircle the vertical axis of vertical-axis WECs 120, providing a structural connection between vertical-axis WECs 120 and pipes 204. For example, support ring 206 may have attachment points for connecting vertical-axis WECs 120 to support ring 206. The attachment points may be various types of coupling mechanisms such as bolts, brackets, or welded joints to secure vertical-axis WECs 120 to pipes 204. Pipes 204 may be formed of at least a metal material, a composite material, or carbon fiber.

Physically coupling vertical-axis WECs 120 to a vertical structure extending from floating structure 200, such as WEC support structure 202, advantageously allows vertical-axis WECs 120 to maintain an optimal position even in rough waters. In some embodiments, vertical-axis WECs 120 is attached to a swivel or hinged connection allowing vertical-axis WECs 120 to pivot and align itself with wave direction while WEC support structure 202 provides increased stability via pipes 204 and support ring 206. In some embodiments, WEC support structure 202 includes other types of devices used to stabilize vertical-axis WECs 120 such as a tethered attachment, guide rails, or a suspension system.

Figure 3B:
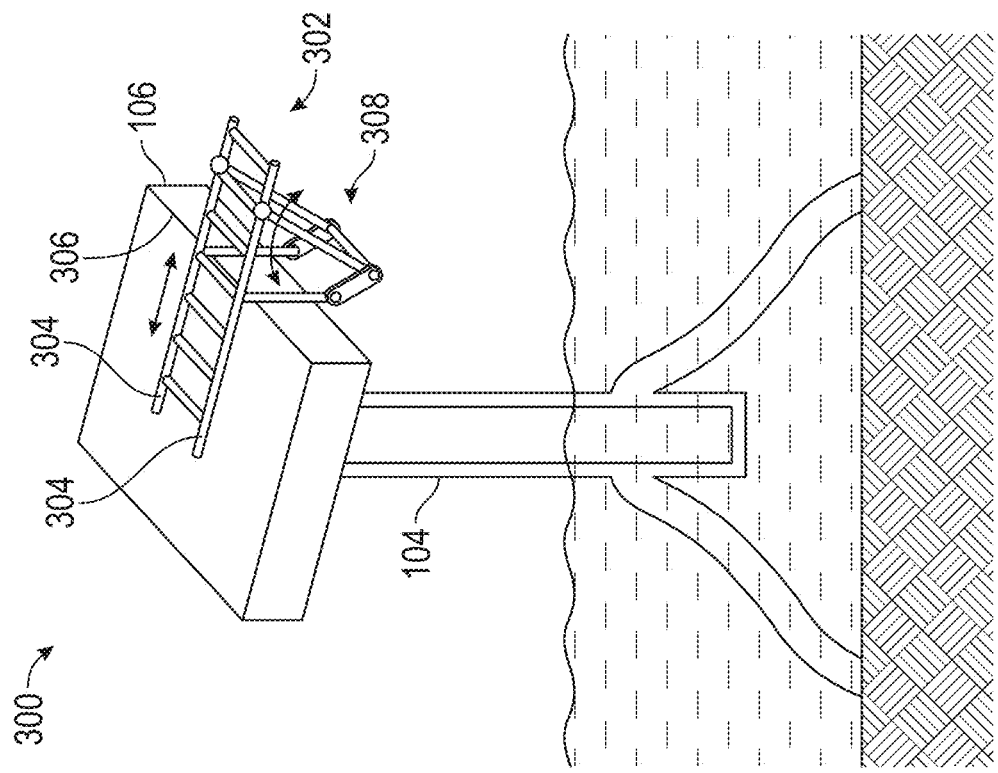
FIG. 3B illustrates an exemplary embodiment of a floating structure including one or more access point structures in an extended position.
Figure 3A:
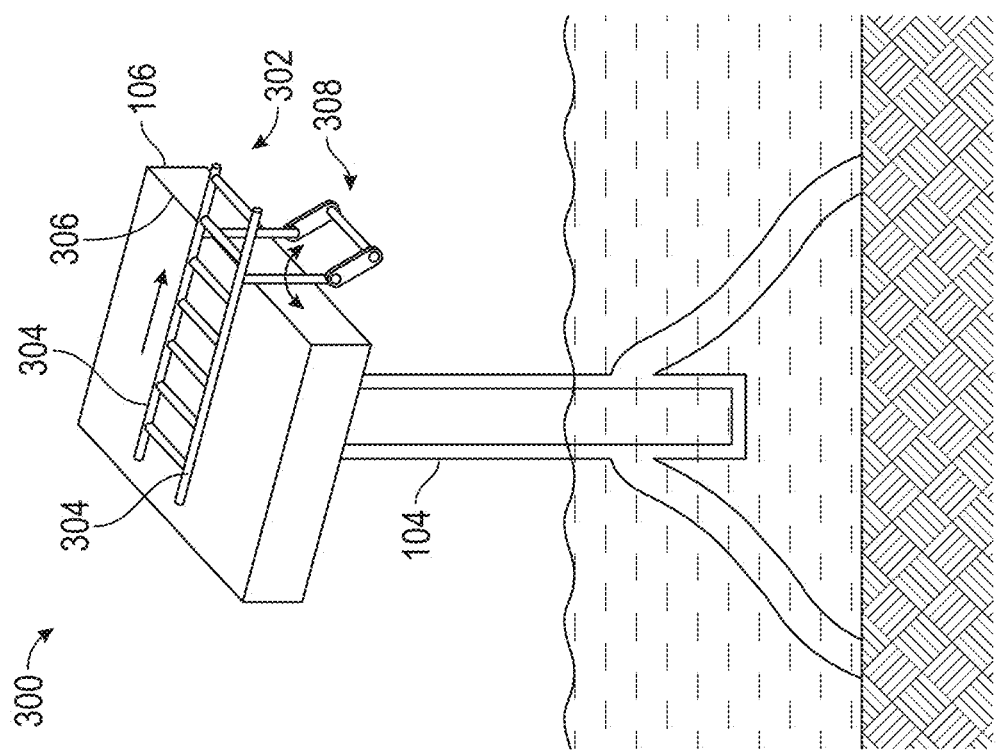
FIG. 3A illustrates an exemplary embodiment of a floating structure including one or more access point structures.

FIG. 3A illustrates an exemplary embodiment of a floating structure 300 including one or more access point structures 302. In some embodiments, floating structure 300 has all features and aspects of floating structure 100 and 200 discussed above in FIGS. 1-2. In some embodiments, floating structure 300 includes access point structures 302. For example, access point structures 302 may be removably coupled to mounting platform 106. Access point structures 302 are configured to provide operators or other external users of floating structure 300 easy access to floating structure 300. For example, access point structures 302 may be used by an operator of a nearby sea vessel to access power support components on mounting platform 106. For instance, an external user may desire to store or access equipment in storage compartments located on mounting platform 106, where access point structures 302 are configured to provide the external user with easy access to the storage compartments. In another example, access point structures 302 are used by an external user (e.g., operator or crew member of an offshore operation) to access fuel storage tanks located on mounting platform 106 for providing or retrieving different types of fuel to fuel a sea vessel.

In some embodiments access point structures 302 are a guide rail system (e.g., sliding structure) including adjustable guide rails 304. For example, the guide rail system may include adjustable guide rails 304 extendable in a horizontal direction such that guide rails 304 extend past an edge 306 of mounting platform 106. The guide rail system may be coupled to mounting platform 106 using coupling mechanisms such as bolted connections, welded connections, or adjustable bracket connections. As shown in FIG. 3A, access point structures 302 may be in a closed position such that the guide rails 304 are not extended.

FIG. 3B illustrates an exemplary embodiment of floating structure 300 including access point structures 302 in an extended position. For example, guide rails 304 of access point structures 302 may be extended into an extended position for providing easy access to external users for mounting floating structure 300. In some embodiments, guide rails 304 are extended using a hinge mechanism. For example, the guide rail system may be extendable using a hinge attachment 308 that may be rotatably hinged such that guide rails 304 extend or detract dependent on the direction the hinge attachment 308 is rotated. In some embodiments, access point structures 302 are configured to be extended in a remote or autonomous manner. For example, sensors, motors, or switches may be attached to access point structures 302 and communicatively coupled to control centers (see one or more control centers 134 discussed above in FIG. 1). The control centers may be configured to extend guide rails 304 by remotely (e.g., via user input) actuating the motors to rotate hinge attachment 308 such that the guide rail system is in an opened or closed configuration. In other embodiments, guide rails 304 are extendable by manually adjusting and extending guide rails 304 without the use of motors.

Access point structures 302 may be any type of structure that provides external users with easier access to mounting platform 106. For example, access point structures 302 may be a helipad for helicopters to land onto. In another embodiment, access point structures 302 may be ladders or ropes vertically extending along a side of mounting platform 106. In some embodiments, access point structures 302 include hoisting cranes designed to lift people, supplies, equipment, and/or power support components 113 (e.g., one or more wind turbines 114) onto and off the mounting platform 106 from nearby sea vessels. In some embodiments, access point structures 302 include one or more docks. The docks extend from a surface of mounting platform 106. For example, the docks may be a flexible floating dock or pontoon dock configured for floating on the water. Access point structures 302 may be used in combination with a ballasting system (see ballasting system 136 discussed above in FIG. 1) for providing access to one or more external users. For example, the ballasting system may be used for raising or lowering mounting platform 106 such that access point structures 302 are easily accessed by one or more external users mounting or demounting floating structure 300.

Figure 4:
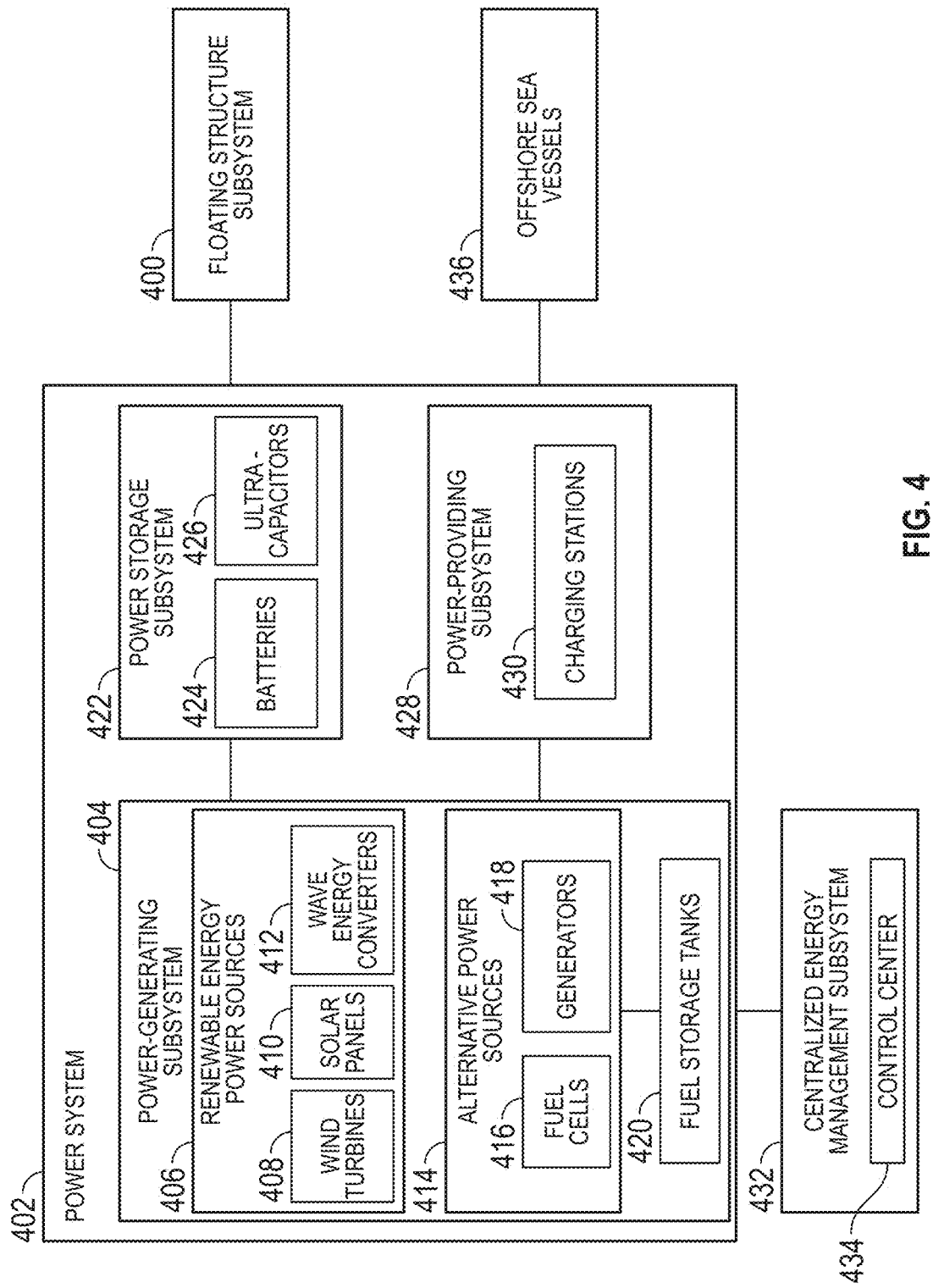
FIG. 4 illustrates a system diagram of a power system integrated within an offshore floating structure for supporting offshore operations.

FIG. 4 illustrates a system diagram of a power system integrated within an offshore floating structure for supporting offshore operations. In some embodiments, the system includes a floating structure subsystem 400. Floating structure subsystem 400 may include any combination of features and aspects described above with respect to floating structures 100, 200, and 300, as discussed above in reference to FIGS. 1-3. For example, floating structure subsystem 400 may include a floating structure with a base and a mounting platform for supporting power support components.

The system further includes a power system 402 configured to provide power to one or more offshore operations. For example, power system 402 is configured to provide power generation, power storage, or power delivery support to offshore operations. Power system 402 may be integrated within floating structure subsystem 400. For example, power system 402 may include one or more power support components removably coupled to the mounting platform (e.g., via modular stations) of floating structure subsystem 400 such that the power support components can be removed and replaced. The power support components of power system 402, as discussed below, have all aspects and features of the power support components as described in FIGS. 1-3, such as wind turbines 114, solar panels 116, attenuator WECs 118, vertical-axis WECs 120, fuel cells 122, generators 124, power storage systems 126, fuel storage tanks 128, charging stations 130, modular stations 131, and control centers 134.

In some embodiments, power system 402 includes a power-generating subsystem 404 configured to generate power for power system 402. For example, power-generating subsystem 404 may include renewable energy power sources 406 for generating power for power system 402. Renewable energy power sources 406 may include wind turbines 408, solar panels 410, and/or wave energy converters 412 (WECs).

In some embodiments, power-generating subsystem 404 includes alternative power sources 414 for generating power for power system 402. Alternative power sources 414 may include fuel cells 416 and/or generators 418. In some embodiments, power-generating subsystem 404 may include fuel storage tanks 420 for storing fuel for alternative power sources 414. In some embodiments, fuel storage tanks 420 provides fuel to one or more alternative power sources 414 via a fuel delivery system such as a network of fuel pumps (e.g., displacement pumps), a piping network of fuel lines, and/or a network of flow control valves (e.g., solenoid or ball valves).

In some embodiments, power system 402 includes a power storage subsystem 422 configured to store power generated by power-generating subsystem 404. For example, power storage subsystem 422 includes batteries 424 and/or ultracapacitors 426. Power storage subsystem 422 may be connected to power-generating subsystem 404 via power cables or wires for transferring the generated power of power-generating subsystem 404 to power storage subsystem 422. In some embodiments, power storage subsystem 422 includes rectifiers and/or charge controllers for regulating the flow of energy from power-generating subsystem 404 to power storage subsystem 422. For example, batteries 424 and ultracapacitors 426 may include rectifiers such that the alternating current generated by wind turbines 408 is converted to direct current for storing in batteries 424 or ultracapacitors 426. In another example, batteries 424 and ultracapacitors 426 may include charge controllers that manage the charging rate of batteries 424 and ultracapacitors 426 to avoid overcharging or overheating the power storage subsystem 422.

In some embodiments, power system 402 includes a power-providing subsystem 428 configured to receive and provide power to offshore operations. The power-providing subsystem 428 includes charging stations 430. For example, charging stations 430 may be electrically connected to power storage subsystem 422 such that the energy stored in power storage subsystem 422 is transferred to charging stations 430. The charging stations 430 may be electrically connected to power storage subsystem 422 via power cables for transferring the energy from power storage subsystem 422 to charging stations 430. Charging stations 430 include power transfer cables configured to electrically connect charging stations 430 to sea vessels or offshore operation equipment. The power transfer cables may be either an alternating current or direct current cable depending on the input charging requirements of the sea vessels or offshore operation equipment. Charging stations 430 includes a charging interface (e.g., plug-in system) configured to physically connect charging stations 430 to charging inlets of sea vessels or offshore operation equipment.

In some embodiments, the power-providing subsystem 428 includes power inverters for converting stored direct current energy in power storage subsystem 422 to alternating current. For example, if power storage subsystem 422 stores energy in direct current and charging stations 430 require alternating current, then power-providing subsystem 428 may include power inverters such that the stored direct current is converted to alternating current for use by charging stations 430. The power inverters may further be used to match the output voltage and current from power storage subsystem 422 to the charging requirements of one or more charging stations 430, ensuring compatibility with various types of equipment (e.g., hybrid electric sea vessel) desired to be charged by charging stations 430. In some embodiments, power-providing subsystem 428 includes DC-DC converters such that the power transferred from power storage subsystem 422 matches the output voltage and current to the charging requirements of charging stations 430 that rely on direct current (e.g., direct charging for DC-compatible electric sea vessels).

In some embodiments, the system includes a centralized energy management subsystem 432 for controlling and managing the flow of fuel and/or energy between the power support components of power system 402. Centralized energy management subsystem 432 includes a control center 434. The control center 434 is configured to control the operation of power-generating subsystem 404, power storage subsystem 422, and/or power-providing subsystem 428 based on demand, generation capacity, and storage levels, ensuring optimal performance and delivery of power generated by power system 402.

The control center 434 is configured to be manually, remotely, and/or autonomously controlled. For example, a manual operator may board the mounting platform of floating structure subsystem 400 and manually provide user input to the control center 434 to control the operation of power-generating subsystem 404, power storage subsystem 422, and power-providing subsystem 428. In another example, the user input provided may be provided via remote means such as a remote device (e.g., computer) located on a sea vessel or an onshore location. Centralized energy management subsystem 432 may include satellite communication equipment, such as antennas, for transmitting and/or receiving signals to or from control center 434. For example, satellite communication equipment is configured to receive one or more signals transmitted by a remote device for controlling the operations of power system 402.

In some embodiments, the control center 434 autonomously controls or monitors power system 402 via one or more control systems. In other embodiments, power system 402 is autonomously controlled or monitored by a single omnibus control system configured to be communicatively connected to the one or more control systems. For example, each subsystem of power system 402 may include a control system for managing the respective subsystem. For instance, power-generating subsystem 404 may include a control system comprised of sensors, cameras, switch gears, transformers, and any other equipment required for the delivery and monitoring of energy generated by power-generating subsystem 404. Data generated by the control system is transmitted to control center 434, which may automatically adjust or control power system 402 based on different parameters and thresholds. For example, control center 434 may stop the operation of at least one wind turbine 408 upon receiving data indicating that wind turbine 408 has a malfunctioning blade. The control system may further be remotely or manually controlled by a user.

In some embodiments, power storage subsystem 422 includes a control system comprised of sensors (e.g., sensors to measure current, voltage, temperature, and state of charge within batteries 424 or one or more ultracapacitors 426), and switches for controlling the flow of electricity transferred to power storage subsystem 422 from power-generating subsystem 404. Control center 434 may be configured to autonomously control and monitor how the generated electricity is stored in power storage subsystem 422. For example, control center 434 may use sensor data to measure the voltage, current, and capacity of batteries 424. Based on the sensor data, the control center 434 determines how much energy to send to each battery 424, ensuring efficient and balanced energy storage. In another example, the control center 434 may adjust the charging rate of batteries 424 or ultracapacitors 426 to prevent overcharging or overheating.

In some embodiments, fuel storage tanks 420 includes a control system comprised of sensors, cameras, switches, and valves for controlling the flow of fuel from fuel storage tanks 420 to power-generating subsystem 404. Control center 434 may be configured to autonomously control and monitor fuel levels, fuel flow rates, and performance metrics of fuel storage tanks 420 based on sensor data received by control center 434. For example, control center 434 may activate an emergency shut-off system to quickly shut off the flow of fuel being supplied from fuel storage tanks 420 based on sensor data indicating that there is a leak coming from fuel storage tanks 420. The control system may further be remotely or manually controlled by a user.

In some embodiments, power-providing subsystem 428 includes a control system comprised of, cameras, switches, and sensors for controlling the flow of energy from power storage subsystem 422 to charging stations 430. Control center 434 may be configured to autonomously control and monitor the flow of energy being provided to charging stations 430 based on sensor data received by the control center 434. For example, if the control center 434 detects from sensor data that the energy flow to charging stations 430 exceeds pre-determined safe limits, control center 434 automatically activates an emergency shutoff mechanism to quickly shut off the energy supply to charging stations 430. The control system may further be remotely or manually controlled by a user.

Control center 434 may also be configured to allocate the generated energy of power system 402 across the various subsystems based on need or predetermined instructions. For example, control center 434 may allocate energy based on data provided by control systems of power-generating subsystem 404, power storage subsystem 422, and power-providing subsystem 428. For instance, control center 434 may manage the flow of energy to ensure batteries 424 or ultracapacitors 426 are not depleted too quickly during high-demand periods (e.g., providing energy to oil and gas drilling operations). In some embodiments, control center 434 is configured to adjust power system 402, as needed, such that sufficient power is being provided to one or more offshore operations (e.g., offshore sea vessels 436).

Figure 5:
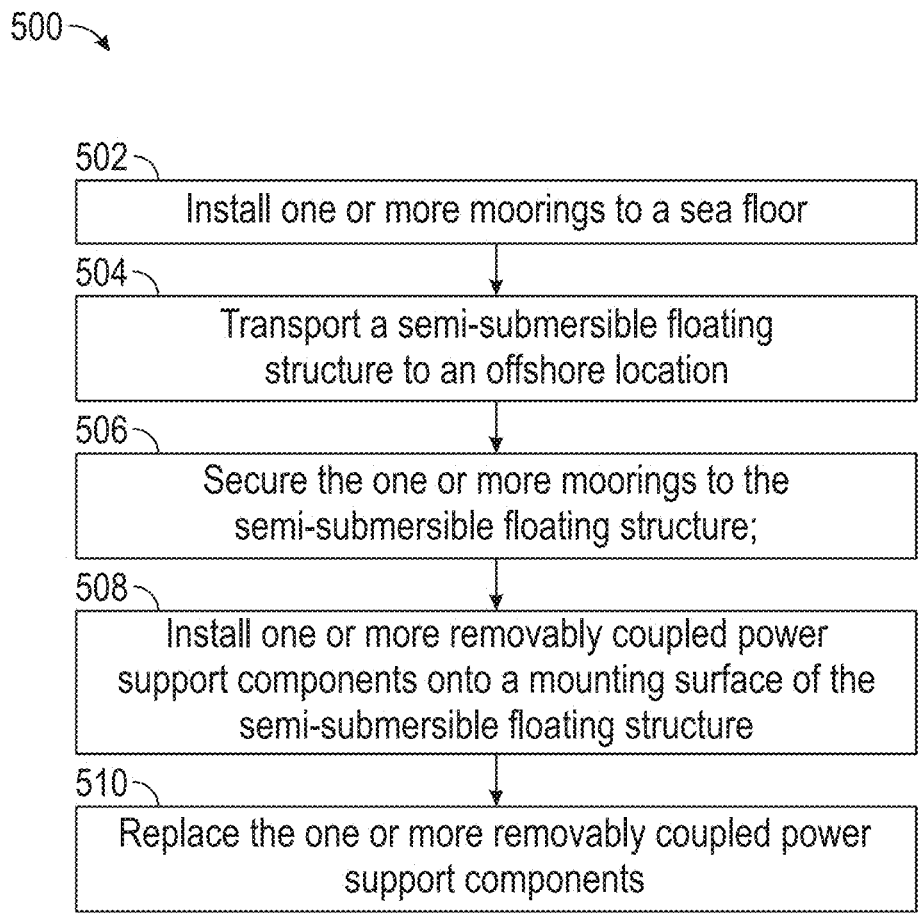
FIG. 5 illustrates an exemplary method of installing an offshore floating structure.

FIG. 5 illustrates an exemplary method 500 of installing an offshore floating structure. In some embodiments, method 500 and portions thereof may be performed routinely to clean, replace, and maintain one or more offshore floating structures and/or power support components removably coupled to one or more offshore floating structures.

At step 502, one or more moorings may be installed on a sea floor. The moorings have all features and aspects of moorings 110 described in FIG. 1. In some embodiments, moorings are installed at various anchoring points on a sea floor prior to moorings being removably coupled to an offshore floating structure. For instance, the moorings may have been used and decoupled from a previous offshore floating structure prior to being removably coupled to the floating structure. In another example, the moorings may be transported and installed to various anchoring points on a sea floor prior to transporting the offshore floating structure to an offshore location.

At step 504, a semi-submersible floating structure may be transported to an offshore location. The floating structure has all features and aspects of floating structures 100, 200, 300, and 400 described in FIGS. 1-4. The floating structure may be transported to an offshore location via transport vessels such as tugboats, barges (e.g., pontoon barges), cargo ship, submersible ships, or semi-submersible ships.

At step 506, the moorings may be secured to the floating structure. The moorings may be secured to the floating structure via any of the coupling methods described in FIG. 1 for coupling the moorings 110 to floating structure 100.

At step 508, one or more removably coupled power support components may be installed onto a mounting platform of the floating structure. The removably coupled power support components have all the same features and aspects of the power support components 113 supported by floating structure 100 described in FIG. 1. For example, the one or more removably coupled power support components may be wind turbines solar panels, or WECs.

At step 510, the one or more removably coupled power support components may be replaced. For example, wind turbines, solar panels, or WECs are configured to be removably coupled to the floating structure such that the wind turbines, solar panels, or WECs are easily removed and replaced. The power support components may be replaced by the same type of component (e.g., replacing a wind turbine for a different wind turbine) or by a different type of component (e.g., replacing a wind turbine with a solar panel). In some embodiments, the power support components are removed and replaced by the same component. For example, a wind turbine may be removed from the floating structure for maintenance purposes, such as cleaning the wind turbine or replacing a blade of the wind turbine, and then subsequently coupled to the floating structure for continued use (e.g., recyclable use). In some embodiments, the power support components are removed and replaced via modular stations.

The following embodiments represent exemplary embodiments of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting.

Clause 1. An offshore semi-submersible floating structure configured for providing support to offshore operations, the offshore semi-submersible floating structure comprising: an elongated base; one or more mooring lines coupled to the elongated base for anchoring the elongated base to a sea floor; a mounting platform coupled to the elongated base; and one or more power support components removably coupled to the mounting platform, the one or more power support components comprising: one or more power sources configured to generate energy; one or more power storage systems configured to store energy generated from the one or more power sources; and one or more electric charging stations configured to receive the energy generated from the one or more power sources or stored in the one or more power storage systems.

Clause 2. The offshore semi-submersible floating structure of clause 1, wherein the one or more power sources comprises one or more renewable energy power sources.

Clause 3. The offshore semi-submersible floating structure of any of clauses 1 or 2, wherein the one or more renewable energy power sources comprises at least one of the following: one or more wind turbines, one or more solar panels, or one or more wave energy converters.

Clause 4. The offshore semi-submersible floating structure of any of clauses 1 through 3, wherein the one or more power sources comprises one or more alternative power sources.

Clause 5. The offshore semi-submersible floating structure of any of clauses 1 through 4, wherein the one or more alternative power sources comprises at least one of the following: one or more fuel cells or one or more generators.

Clause 6. The offshore semi-submersible floating structure of any of clauses 1 through 5, wherein the one or more power storage systems comprises at least one of the following: one or more batteries or one or more ultracapacitors.

Clause 7. The offshore semi-submersible floating structure of any of clauses 1 through 6, wherein the one or more power support components further comprises one or more storage compartments.

Clause 8. The offshore semi-submersible floating structure of any of clauses 1 through 7, wherein the one or more power support components are removably coupled to the mounting platform via one or more modular stations.

Clause 9. The offshore semi-submersible floating structure of any of clauses 1 through 8, wherein the elongated base comprises a ballast system, wherein the ballast system is integrated within the mounting platform and the elongated base such that the mounting platform and the elongated base may be raised or lowered relative to a sea level.

Clause 10. The offshore semi-submersible floating structure of any of clauses 1 through 9, wherein the mounting platform comprises an access point structure, the access point structure comprising two or more adjustable guide rails configured to provide access to the mounting platform to one or more users of a sea vessel.

Clause 11. The offshore semi-submersible floating structure of any of clauses 1 through 10, wherein the elongated base and the mounting platform comprise at least a composite material including a metal material.

Clause 12. An offshore semi-submersible floating structure configured for providing support to offshore operations, the offshore semi-submersible floating structure comprising: an elongated base; one or more mooring lines coupled to the elongated base for anchoring the elongated base to a sea floor; a mounting platform coupled to the elongated base; and one or more power support components removably coupled to the mounting platform, the one or more power support components comprising: one or more wind turbines; one or more solar panels; one or more wave energy converters; one or more fuel cells; one or more batteries configured to store energy generated from the one or more wind turbines, the one or more solar panels, the one or more wave energy converters, and the one or more fuel cells; one or more electric charging stations configured to receive the energy generated from the one or more wind turbines, the one or more solar panels, the one or more wave energy converters, the one or more fuel cells, or the one or more batteries; and one or more fuel storage tanks configured to provide fuel to the one or more fuel cells.

Clause 13. The offshore semi-submersible floating structure of clause 12, wherein the one or more power support components further comprises one or more storage compartments.

Clause 14. The offshore semi-submersible floating structure of clause 12 or 13, wherein at least one of the one or more wave energy converters is an attenuator wave energy converter.

Clause 15. The offshore semi-submersible floating structure of any of clauses 12 through 14, wherein at least one of the one or more wave energy converters is a vertical-axis wave energy converter.

Clause 16. The offshore semi-submersible floating structure of any of clauses 12 through 15, wherein the vertical-axis wave energy converter is coupled to the mounting platform via one or more composite pipes.

Clause 17. The offshore semi-submersible floating structure of any of clauses 12 through 16, wherein one or more buoys are coupled to the mounting platform.

Clause 18. The offshore semi-submersible floating structure of any of clauses 12 through 17, wherein at least one of the elongated base or the mounting platform comprises a protective cover.

Clause 19. An offshore semi-submersible power-generation system configured for providing support to offshore operations, the offshore semi-submersible power-generation system comprising: a floating structure subsystem comprising: an elongated base; and a mounting platform coupled to the elongated base; a power-generating subsystem removably coupled to the mounting platform, the power-generating subsystem comprising: one or more renewable energy power sources, wherein the one or more renewable energy power sources are at least one or more solar panels; and one or more alternative power sources, wherein one or more fuel storage tanks are configured to provide fuel to the one or more alternative power sources; a power storage subsystem removably coupled to the mounting platform, comprising: one or more power storage systems configured to store energy generated from the one or more renewable energy power sources or the one or more alternative power sources; a power-providing subsystem removably coupled to the mounting platform, comprising: one or more electric charging stations configured to receive the energy generated from the one or more renewable energy power sources or the one or more alternative power sources or stored in the one or more power storage systems; and a centralized energy management subsystem removably coupled to the mounting platform, comprising: a control center configured to control a distribution of the energy generated from the power-generating subsystem to the power storage subsystem and the power-providing subsystem.

Clause 20. The offshore semi-submersible power-generation system of clause 19, wherein the one or more solar panels are coupled to a robotic system configured to autonomously clean the one or more solar panels.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. An offshore semi-submersible floating structure configured for providing support to offshore operations, the offshore semi-submersible floating structure comprising:
   an elongated base;
   one or more mooring lines coupled to the elongated base for anchoring the elongated base to a sea floor;
   a mounting platform coupled to the elongated base; and
   one or more power support components removably coupled to the mounting platform, the one or more power support components comprising:
   one or more renewable energy power sources;
   one or more power storage systems configured to store energy generated from the one or more renewable energy power sources;
   one or more electric charging stations configured to receive the energy generated from the one or more renewable energy power sources or stored in the one or more power storage systems; and
   a centralized energy management subsystem, comprising:
   a control center configured to control a distribution of the energy generated from the one or more renewable energy power sources to the one or more power storage systems and the one or more electric charging stations.

2. The offshore semi-submersible floating structure of claim 1, wherein the one or more renewable energy power sources comprises one or more wind turbines.

3. The offshore semi-submersible floating structure of claim 2, wherein the one or more renewable energy power sources further comprises at least one of the following: one or more solar panels or one or more wave energy converters.

4. The offshore semi-submersible floating structure of claim 1, wherein the one or more power support components further comprises one or more alternative power sources.

5. The offshore semi-submersible floating structure of claim 4, wherein the one or more alternative power sources comprises at least one of the following: one or more fuel cells or one or more generators.

6. The offshore semi-submersible floating structure of claim 5, wherein the one or more power support components further comprises one or more fuel storage tanks configured to provide fuel to the one or more alternative power sources.

7. The offshore semi-submersible floating structure of claim 1, wherein the one or more power storage systems comprises at least one of the following: one or more batteries or one or more ultracapacitors.

8. The offshore semi-submersible floating structure of claim 1, wherein the one or more power support components are removably coupled to the mounting platform via one or more modular stations.

9. The offshore semi-submersible floating structure of claim 1, wherein the elongated base comprises a ballast system, wherein the ballast system is integrated within the mounting platform and the elongated base such that the mounting platform and the elongated base may be raised or lowered relative to a sea level.

10. The offshore semi-submersible floating structure of claim 1, wherein the mounting platform comprises an access point structure, the access point structure comprising two or more adjustable guide rails configured to provide access to the mounting platform to one or more users of a sea vessel.

11. The offshore semi-submersible floating structure of claim 1, wherein the elongated base and the mounting platform comprise at least a composite material including a metal material.

12. An offshore semi-submersible floating structure configured for providing support to offshore operations, the offshore semi-submersible floating structure comprising:
an elongated base;
a mounting platform coupled to the elongated base; and
one or more power support components removably coupled to the mounting platform, the one or more power support components comprising:
one or more renewable energy power sources;
one or more batteries configured to store energy generated from the one or more renewable energy power sources;
one or more electric charging stations configured to receive the energy generated from the one or more renewable energy power sources or the one or more batteries; and
a centralized energy management subsystem, comprising:
a control center configured to control a distribution of the energy generated from the one or more renewable energy power sources to the one or more batteries and the one or more electric charging stations.

13. The offshore semi-submersible floating structure of claim 12, wherein the one or more power support components further comprises one or more storage compartments.

14. The offshore semi-submersible floating structure of claim 12, wherein the one or more renewable energy power sources comprises:
one or more wind turbines, one or more solar panels, and one or more wave energy converters.

15. The offshore semi-submersible floating structure of claim 14, wherein at least one of the one or more wave energy converters is a vertical-axis wave energy converter.

16. The offshore semi-submersible floating structure of claim 15, wherein the vertical-axis wave energy converter is coupled to the mounting platform via one or more composite pipes.

17. The offshore semi-submersible floating structure of claim 12, wherein one or more buoys are coupled to the mounting platform.

18. The offshore semi-submersible floating structure of claim 12, wherein at least one of the elongated base or the mounting platform comprises a protective cover.

19. An offshore semi-submersible power-generation system configured for providing support to offshore operations, the offshore semi-submersible power-generation system comprising:
a floating structure subsystem comprising:
an elongated base; and
a mounting platform coupled to the elongated base;
a power-generating subsystem removably coupled to the mounting platform, the power-generating subsystem comprising:
one or more renewable energy power sources;
a power storage subsystem removably coupled to the mounting platform, comprising:
one or more power storage systems configured to store energy generated from the one or more renewable energy power sources;
a power-providing subsystem removably coupled to the mounting platform, comprising:
one or more electric charging stations configured to receive the energy generated from the one or more renewable energy power sources or stored in the one or more power storage systems; and
a centralized energy management subsystem removably coupled to the mounting platform, comprising:
a control center configured to control a distribution of the energy generated from the power-generating subsystem to the power storage subsystem.

20. The offshore semi-submersible power-generation system of claim 19, wherein the one or more renewable energy power sources are coupled to a robotic system configured to autonomously clean the one or more renewable energy power sources.

* * * * *